United States Patent [19]

Baldoni

[11] Patent Number: 5,029,666
[45] Date of Patent: Jul. 9, 1991

[54] COLLAPSIBLE MOTORCYCLE

[76] Inventor: Viscardo Baldoni, Via delle Case Basse, 195 Acilia, Roma, Italy

[21] Appl. No.: 499,883

[22] Filed: Mar. 27, 1990

[51] Int. Cl.$^5$ .............................................. B60K 15/00
[52] U.S. Cl. ................................... 180/208; 180/219; 280/287
[58] Field of Search ................ 180/208, 219; 280/287, 280/278

[56] References Cited

U.S. PATENT DOCUMENTS

| 3,572,757 | 3/1971 | Camps | 180/208 |
| 4,026,573 | 5/1977 | Richardson | 180/208 |
| 4,830,133 | 5/1989 | Gaddi | 180/208 |

Primary Examiner—Kenneth R. Rice
Attorney, Agent, or Firm—Klauber & Jackson

[57] ABSTRACT

A collapsible motorcycle, the frame of which presents an intermediate body from the opposite ends of which extend two arms respectively supporting a front and rear wheel; which arms are connected to the intermediate body by means of respective hinge devices enabling displacement of the arms, in relation to the intermediate body, between a distended position, wherein the arms extend in substantially diverging manner from the intermediate body, and a collapsed position wherein the arms extend from the intermediate body in converging, crossover manner, with the rear wheel located to the front of the front wheel.

26 Claims, 7 Drawing Sheets

COLLAPSIBLE MOTORCYCLE

BACKGROUND OF THE INVENTION

The present invention relates to a collapsible motorcycle.

In particular, the present invention relates to a motorcycle having a frame consisting of an articulated structure designed to assume both a normal distended configuration, and a relatively compact collapsed configuration. The advantages afforded by a collapsible motorcycle of the aforementioned type depend on how closely it compares, when distended, with a non-collapsible type in terms of size, component arrangement, operating stability, safety and reliability, as well as on the distended-collapsed size ratio provided for.

Known collapsible motorcycles of the aforementioned type all present an articulated frame, usually comprising an intermediate body, the front and rear ends of which are fitted with two forks or similar supporting a front and rear wheel, a steering device, and a seat.

Known collapsible motorcycles of the aforementioned type are divided into two main types, according to the type and location of the articulated joints involved. The first presents an intermediate body constituting a non-collapsible assembly together with the forks and wheels; the only collapsible parts being the steering device and seat, together with the column connecting the seat to the intermediate body. When collapsed, motorcycles of this type provide solely for a reduction in height, which is usually maximised by employing relatively small-diameter wheels, locating the intermediate body as low down as possible, and employing a seat column and steering device or handlebar as long as possible and collapsible over the intermediate body. Moreover, the length of the motorcycle, which remains substantially the same in both the distended and collapsed configuration is minimised by adopting a relatively short wheel base.

Such a structure obviously results in poor stability and impaired performance of the motorcycle over obstacles such as kerbs or rails.

The second type is substantially similar to the first, except that one of the forks, usually the rear one, is collapsible in relation to the intermediate body. Though this type, when collapsed, provides for a reduction in both height and length, thus enabling an increase in wheel size and base and, consequently, improved stability and maneuverability, the size ratio between the distended and collapsed configurations remains unsatisfactory, with only a limited reduction in height, due to the non-collapsible nature of one of the forks.

SUMMARY OF THE INVENTION

The aim of the present invention is to provide a collapsible motorcycle which, for a given wheel diameter, provides for maximum compactness when collapsed, and, for a given collapsed length, provides for a maximum wheel base when distended.

With this aim in view, according to the present invention, there is provided a collapsible motorcycle comprising a frame, a front steering wheel, a rear wheel, and an engine supported on said frame and connected to one of said wheels; said front wheel, in the non-steering position, and said rear wheel presenting, in use, a common vertical plane of symmetry; and said frame comprising a longitudinal intermediate body substantially parallel to said plane; a first element between said front wheel and a front portion of said intermediate body; a second element between said rear wheel and a rear portion of said intermediate body; and a steering device; characterised by the fact that said first and said second element comprise a respective first and second arm, and a respective first and second transverse hub integral with respective said arms and connected for rotation to respective said front and rear wheels; first and second hinge connecting means being provided between said intermediate body and respective said first and second arms; said hinge connecting means being designed to enable displacement, in relation to said intermediate body, of said first arm with said front wheel and said second arm with said rear wheel along a respective first and second non-interfering path, and between a distended position wherein said arms extend in substantially diverging manner from said intermediate body, and a collapsed position wherein said rear wheel is located to the front of said front wheel, and said arms extend in converging manner from said intermediate body.

BRIEF DESCRIPTION OF THE DRAWINGS

A non-limiting embodiment of the present invention will be described with reference to the accompanying drawings, in which.

DETAILED DESCRIPTION OF THE INVENTION

Figure 1:
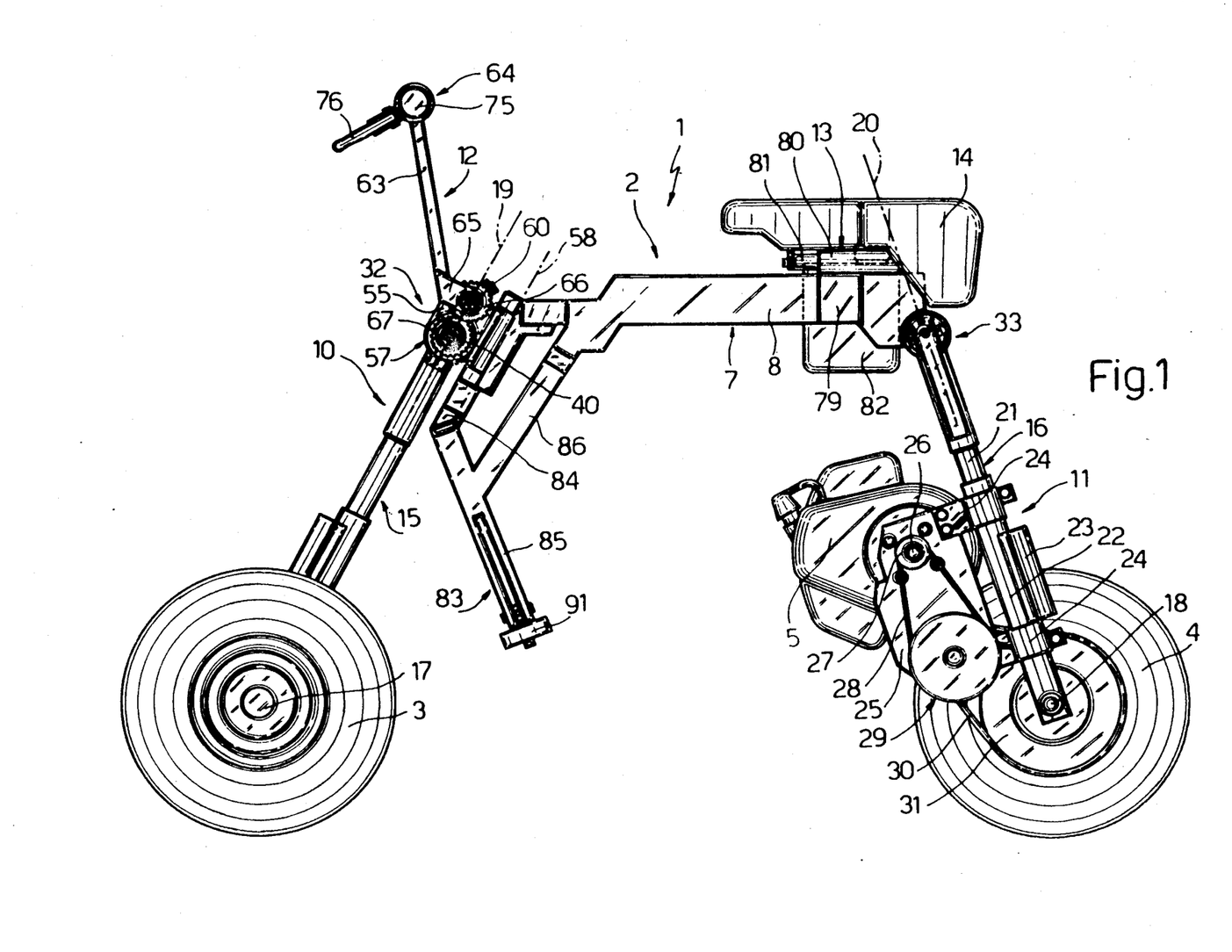
FIG. 1 shows a side view of a preferred embodiment of the collapsible motorcycle according to the present invention in the distended position.
Figure 2:
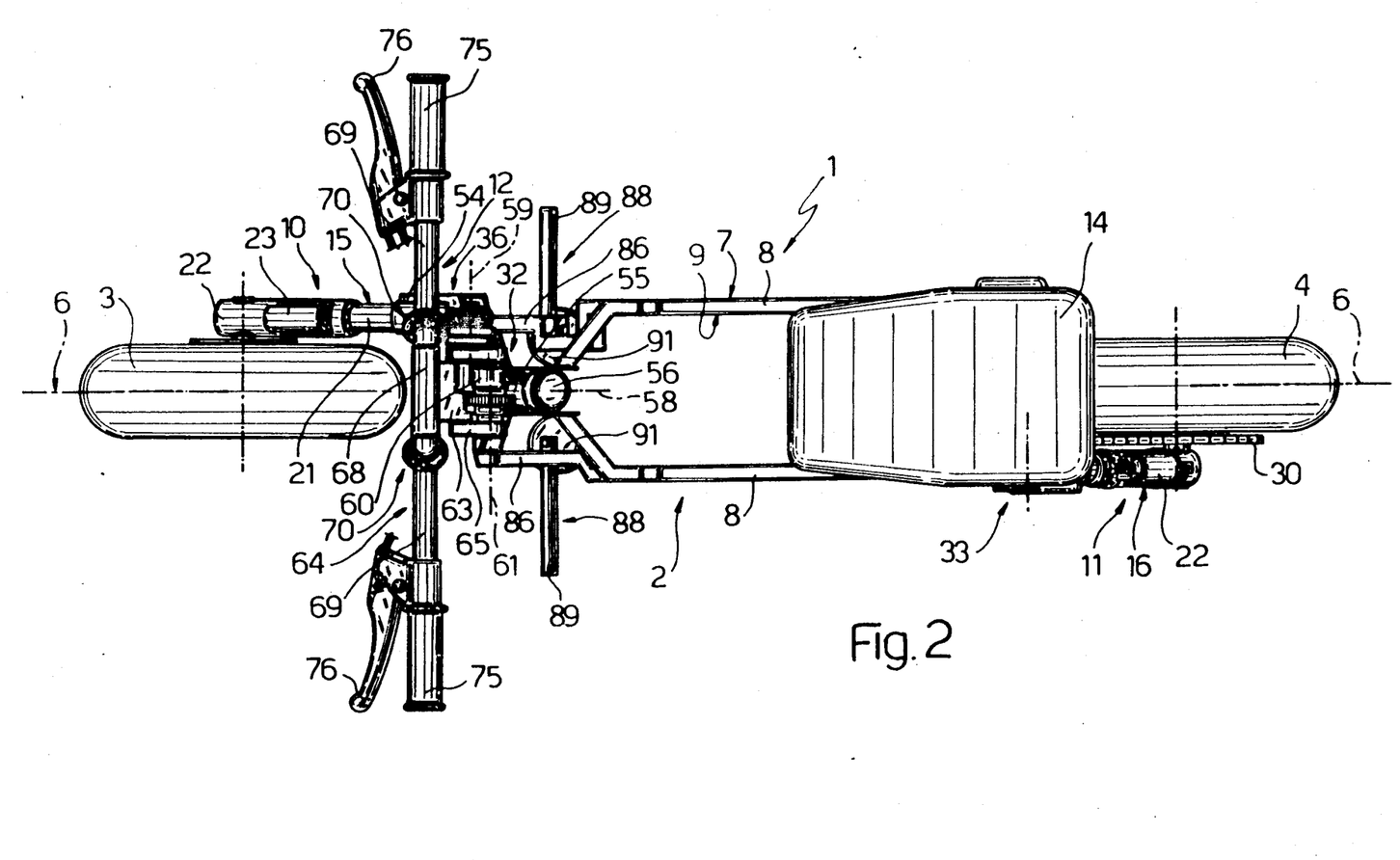
FIG. 2 shows a top plan view of the FIG. 1 motorcycle in the distended position.
Figure 3:
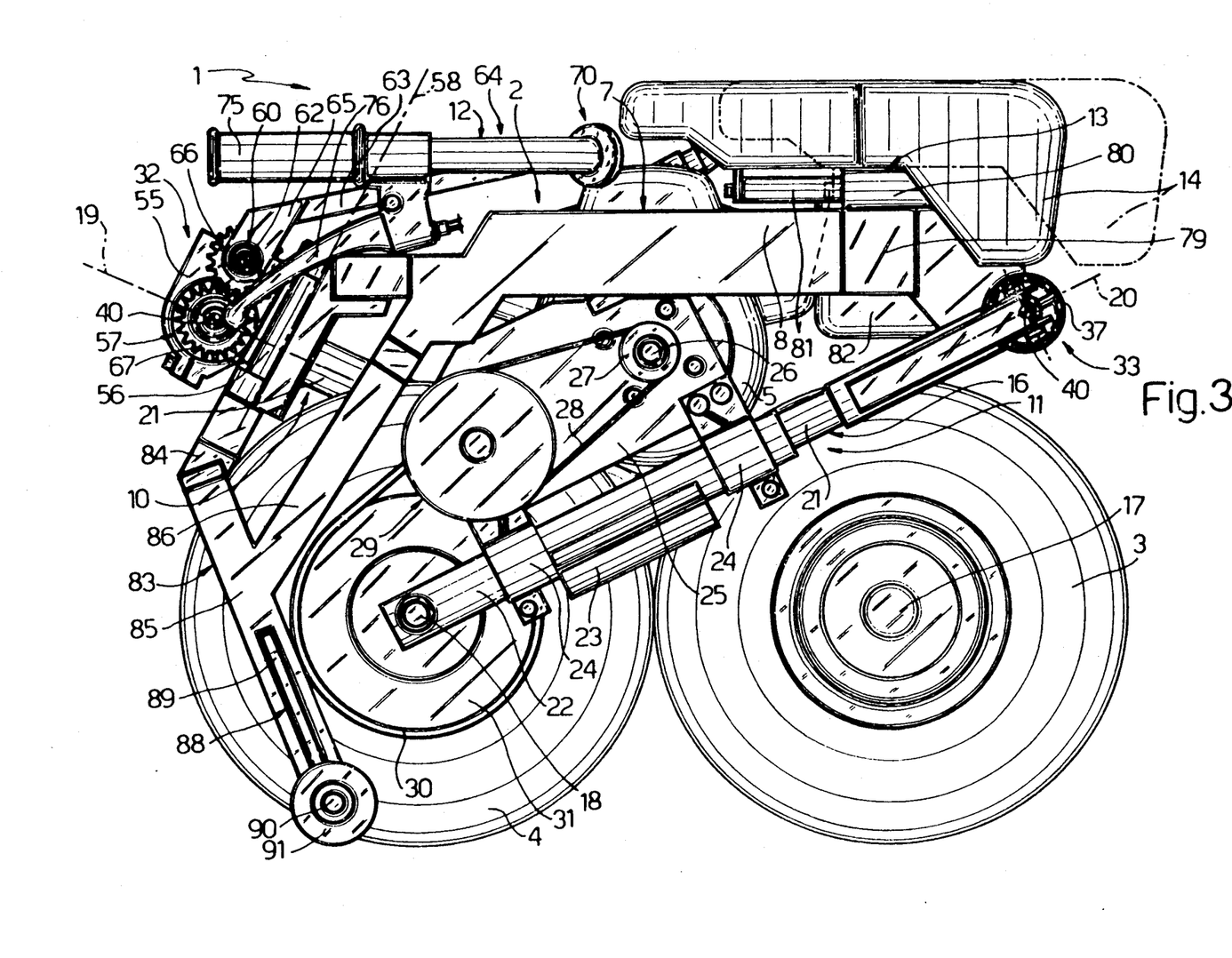
FIG. 3 shows a side view of the FIG. 1 motorcycle in the collapsed position.

Number 1 in FIGS. 1 to 3 indicates a collapsible motorcycle comprising a frame 2, a front steering wheel 3, a rear wheel 4, and an engine 5 supported on frame 2 and connected to rear wheel 4.

When motorcycle 1 is in the normal distended position, with front wheel 3 in the non-steering position, wheels 3 and 4 present a common vertical plane of symmetry 6, as shown in FIG. 2.

Frame 2 comprises an elongated longitudinal intermediate body 7 having a vertical plane of symmetry substantially coincident with plane 6, and consisting of two substantially C-shaped side members 8 having their respective concave sides facing each other and connected together at opposite ends so as to define a through opening 9. Frame 2 also comprises a first element 10 between front wheel 3 and a front portion of intermediate body 7; a second element 11 between rear wheel 4 and a rear portion of intermediate body 7; a steering device 12 extending upwards from a front portion of intermediate body 7; and a supporting device 13 for a seat 14 on a rear portion of intermediate body 7.

Said elements 10 and 11 comprise respective arms 15 and 16 fitted at their respective bottom ends with respective transverse hubs 17 and 18 connected for rotation to front wheel 3 and rear wheel 4 respectively. As shown in FIG. 2, when motorcycle 1 is in the distended position, with front wheel 3 in the non-steering position, arms 15 and 16 extend from opposite sides of, and parallel to, plane 6; and hubs 17 and 18 extend from respective arms 15 and 16 towards and perpendicular to plane 6. Moreover, when motorcycle 1 is in the distended position shown in FIG. 1, arms 15 and 16 extend along respective axes 19 and 20 which, when projected on to plane 6, diverge downwards from intermediate body 7.

Each of arms 15 and 16 consists of a telescopic damper comprising a cylindrical telescopic top and bottom tube 21 and 22, and a key device 23 (shown schematically) inserted between tubes 21 and 22 for preventing rotation of tube 22 in relation to tube 21.

As shown in FIG. 1, bottom tube 22 of rear arm 16 supports, by means of two brackets 24, a substantially vertical plate 25 located frontwards of arm 16 and supporting engine 5 in projecting manner. Engine 5 is located on the side of plate 25 facing plane 6, and presents an output shaft 26 fitted through plate 25 and supporting a pulley 27. Pulley 27 is connected, by means of a belt 28, to a reduction unit 29 supported on plate 25 and connected, via chain 30, to a sprocket 31 integral with wheel 4.

Top tubes 21 of arms 15 and 16 are connected to the respective ends of intermediates body 7 via respective hinge devices 32 and 33.

Figure 8:
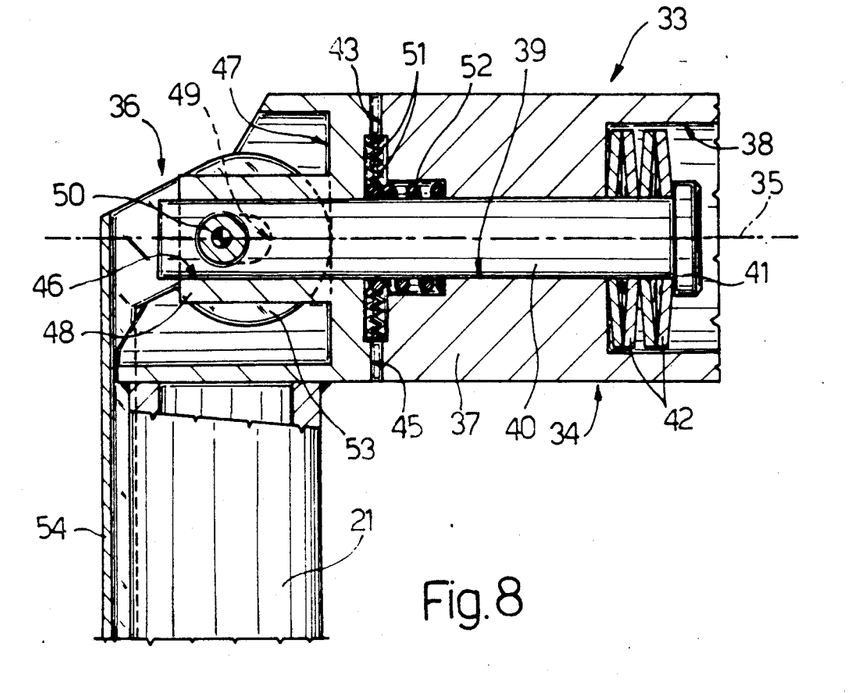
FIGS. 8 and 9 show axial sections of a first detail in FIG. 1 in two different operating positions.
Figure 9:
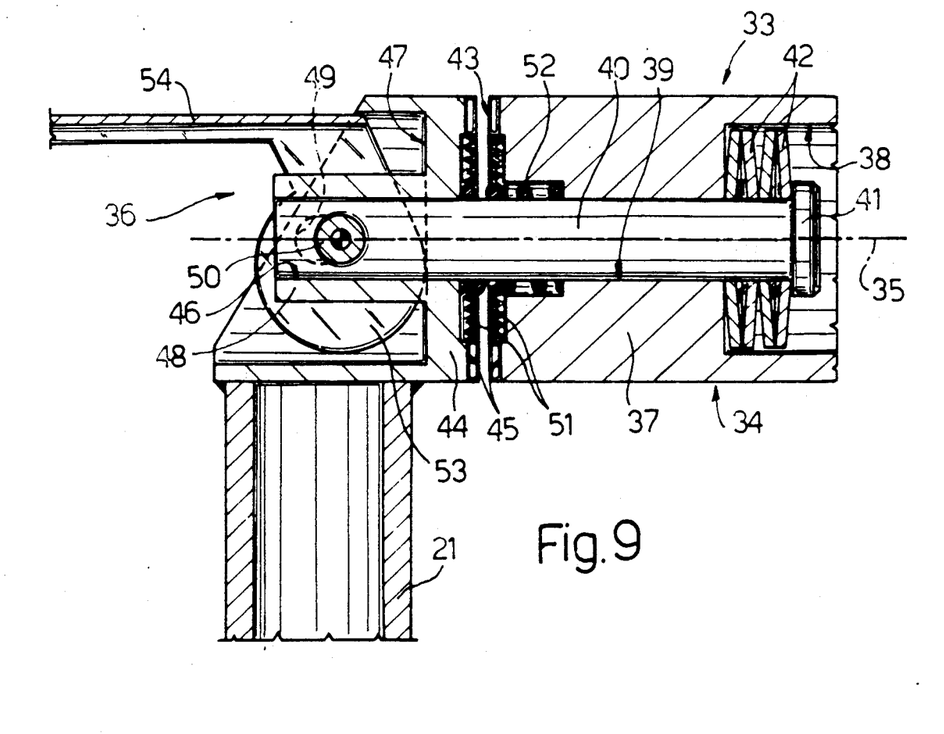

As shown in FIGS. 8 and 9, hinge device 33 comprises a cylindrical hinge 34 having a substantially horizontal axis 35 perpendicular to plane 6 and axis 20, and a lock device 36.

In more detail, said hinge 34 comprises a cylindrical block 37 integral with the rear end of intermediate body 7, and having, at one end, an axial cavity 38 from the end surface of which extends an axial through hole 39. Hinge 34 also comprises a cylindrical pin 40 engaging hole 39 in a rotary manner, and having an end head 41 located inside cavity 38 and cooperating with the end surface of the same via the interposition of a number of Belleville washers 42. At the opposite end to cavity 38, block 37 presents an annular surface 43 from which an end portion of pin 40, opposite head 41 projects outwards and is fitted with the top end of tube 21 of arm 16 so as to turn, with arm 16, in relation to intermediate body 7 and about axis 35. Tube 21 is fitted on to pin 40 by means of lock device 36, which comprises a cylindrical block 44 coaxial with block 37 and having an end surface 45 facing and parallel to surface 43. Block 44 is laterally integral with tube 21 and presents a through hole 46 coaxial with hole 39 and engaged by pin 40. On the opposite side to surface 45, block 44 presents an annular axial cavity 47 defining a tubular appendix 48 through which extends hole 46, and which presents two diametrically-opposed axial slots 49 engaged in transversely-sliding manner by the opposite ends of pin 50, the middle portion of which is locked inside a diametrical hole formed through pin 40. Lock device 36 also comprises two sets of right-angle teeth 51 respectively mating with surfaces 43 and 45; a spiral spring 52 between blocks 37 and 44; and a fork cam 53 fitted on to pin 50 and having a lever 54 for rotating cam 53, in relation to pin 50 and in contact with the end surface of cavity 47, between a locked position (FIG. 8) wherein teeth 51 mesh so as to render intermediate body 7 and arm 16 integral with each other, and a released position (FIG. 9) wherein teeth 51 are released, thus enabling arm 16 to rotate, in relation to intermediate body 7, about axis 35.

As shown, particularly in FIGS. 1 and 2, hinge device 32 comprises a bridge element 55 between the top end of tube 21 of arm 15 and intermediate body 7; a first cylindrical hinge 56 connecting bridge element 55 to intermediate body 7; and a second cylindrical hinge 57 connecting bridge element 55 to tube 21 of arm 15. Hinge 56 constitutes the steering hinge of wheel 3, and presents an axis 58 lying in plane 6 and parallel to axis 19 of arm 15; whereas hinge 57 presents a substantially horizontal axis 59 perpendicular to axis 58, and perpendicular to plane 6 when wheel 3 is in the non-steering position.

Hinge 57 presents a structure substantially identical to that of hinge device 33, and comprises a lock device identical to lock device 36 of hinge 34. For the sake of simplicity, therefore, certain parts of hinge 57 mentioned hereinafter will be referred to using the same reference numbers as the corresponding parts on hinge device 33.

Hinge device 32 also comprises a third cylindrical hinge 60 having an axis 61 parallel to axis 59 and comprising a center pin 62 mounted for rotation inside a through sleeve connected integral with bridge element 55.

As shown, particularly in FIGS. 1 and 2, steering device 12 comprises a column 63 and a handlebar 64 connected to the top end of column, 63, the bottom end of which defines a fork 65 connected integral with pin 62 and designed to turn with the same about axis 61.

Pin 62 of hinge 60 and pin 40 of hinge 57 are fitted with respective cylindrical gears 66 and 67 meshing in such a manner that rotation of column 63 in a given direction about axis 61 causes arm 15 to turn in the opposite direction about axis 59.

Figure 10:
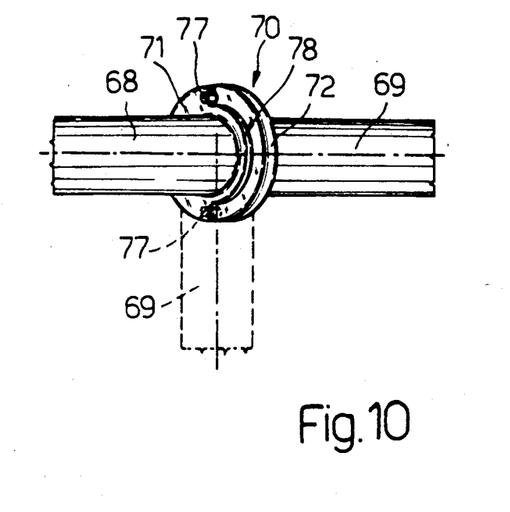
FIGS. 10 and 11 show a plan and side view respectively of a second detail in FIG. 1 in two different operating positions.
Figure 11:
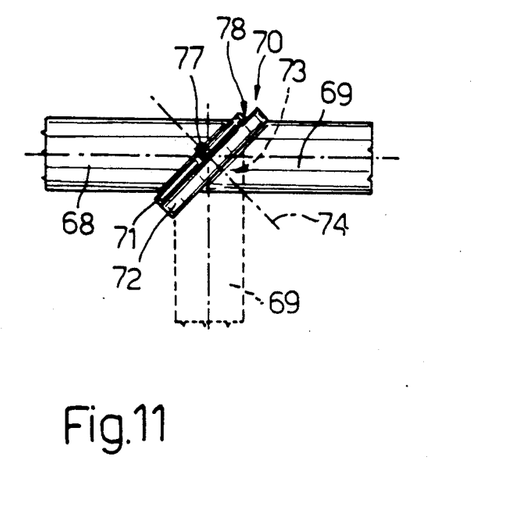

As shown in FIG. 2 and particularly in FIGS. 10 and 11, column 63 presents a top crosspiece 68, each end of which is connected to a rod 69 via a coupling 70 enabling respective rod 69 to be moved, in relation to column 63, between a first distended position, wherein rod 69 is substantially coaxial with crosspiece 68, and a second collapsed position wherein rod 69 is substantially parallel and adjacent to column 63.

Each coupling 70 comprises a flange 71 and a counter-flange 72 arranged facing and in sliding contact with each other. Flanges 71 and 72 are respectively integral with crosspiece 68 and rod 69, and are inclined substantially 45° to the axis of crosspiece 68. Flanges 71 and 72 are connected by a center pin (not shown) and constitute a cylindrical hinge 73 having its axis 74 perpendicular to flanges 71 and 72 and inclined substantially 45° in relation to the longitudinal axis of column 63.

By virtue of the angle of axis 74, displacement of rod 69 from the distended to the collapsed position causes rod 69 to turn approximately 45° about its own axis.

The end of each rod 69 is fitted with a knob 75 having a control lever 76 which, with respective rod 69 in the distended position, projects forward of knob 75 (FIG. 1) in a convenient, slightly downward-sloping position substantially perpendicular to column 63. When rod 69 is collapsed, rotation of rod 69 about its axis moves respective laver 76 into a position substantially parallel to plane 6 (FIG. 3). For enabling each rod 69 to be set in said distended and collapsed positions, flange 72 presents an axial pin 77 designed to travel a given distance along a groove 78 formed along a peripheral portion of respective flange 71. As shown, particularly in FIG. 3, device 13 supporting seat 14 is a slide type device comprising two brackets 79, each integral with a rear portion of a respective side member 8 of intermediate body 7, and each projecting over intermediate body 7 so as to form a substantially horizontal tube 80 parallel to plane 6. Each of tubes 80 is engaged in sliding manner by a rod 81 longer than respective tube 80 and the opposite ends of which are integral with the bottom surface of seat 14 for enabling this to move parallel to plane 6 between a forward collapsed position and a rear distended position, as shown respectively by the continuous and dotted lines in FIG. 3.

The portion of opening 9 extending between brackets 79 beneath seat 14 houses a fuel tank 82 supported on intermediate body 7.

As shown, particularly in FIGS. 1 and 3, a front portion of intermediate body 7 is fitted with a downward-extending rearward-sloping fork member 83 connected at the top end to intermediate body 7 by means of a bracket 84, and comprising two arms or bars 85 located on opposite sides of plane 6 and each connected centrally to a respective side member 8 by means of a strut 86 substantially parallel to axis 58.

Figure 12:
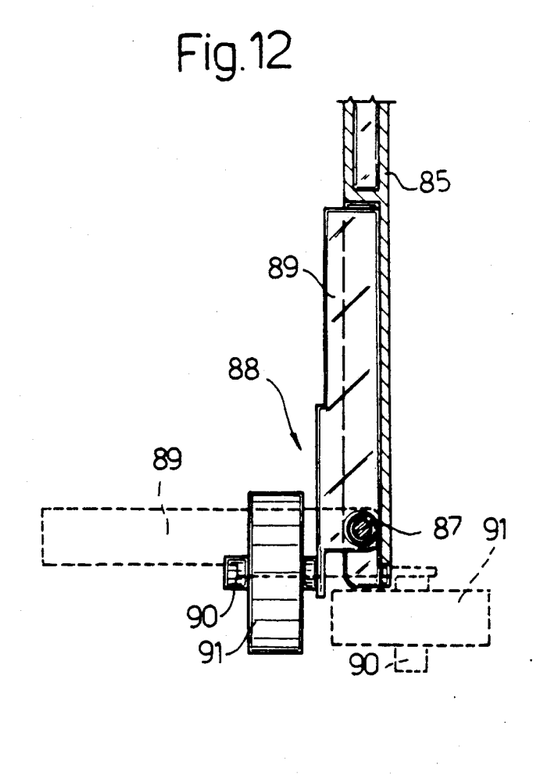
FIGS. 12 and 13 show a rear and side view respectively of a third detail in FIG. 1 in two different operating positions.
Figure 13:
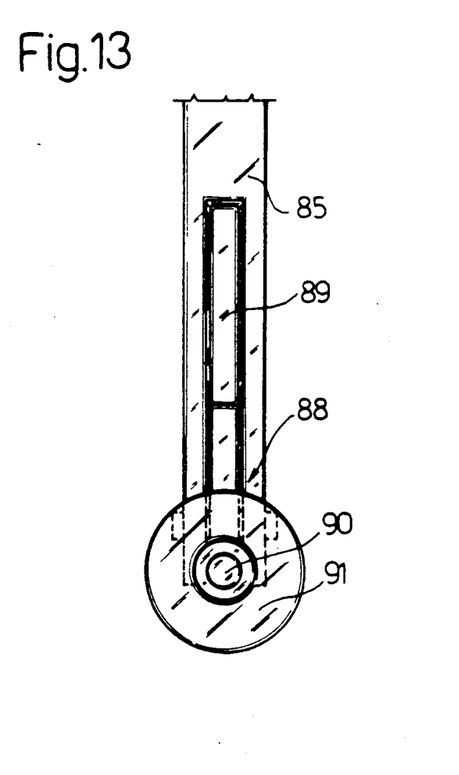

As shown, particularly in FIGS. 12 and 13, the bottom end of each bar 85 is fitted in rotary manner, via a substantially horizontal pin 87 parallel to plane 6, with a square rocker arm 88 comprising two perpendicular arms 89 and 90. Arm 89 constitutes a footrest designed to move, subsequent to rotation of rocker arm 88 about the axis of pin 87, between a collapsed or raised position (continuous line in FIG. 12) substantially parallel to respective bar 85, and a distended or lowered position (dotted line in FIG. 12) substantially perpendicular to bar 85.

Arms 90 of rocker arms 88 constitute the support and rotation pins of respective wheels 91, which, with rocker arms 88 in the raised position, are located coaxial with each other and on opposite sides of and substantially parallel to plane 6.

As shown in FIG. 3, bars 85 define an opening for housing rear wheel 4 in the collapsed position.

With rear wheel 4 in the collapsed position and rocker arms 88 raised, wheels 91 project beneath rear wheel 4, so as to define a carriage for supporting and transporting motorcycle 1.

The procedure for collapsing motorcycle 1 will be described with reference to FIGS. 4 to 7.

Figures 4, 5:
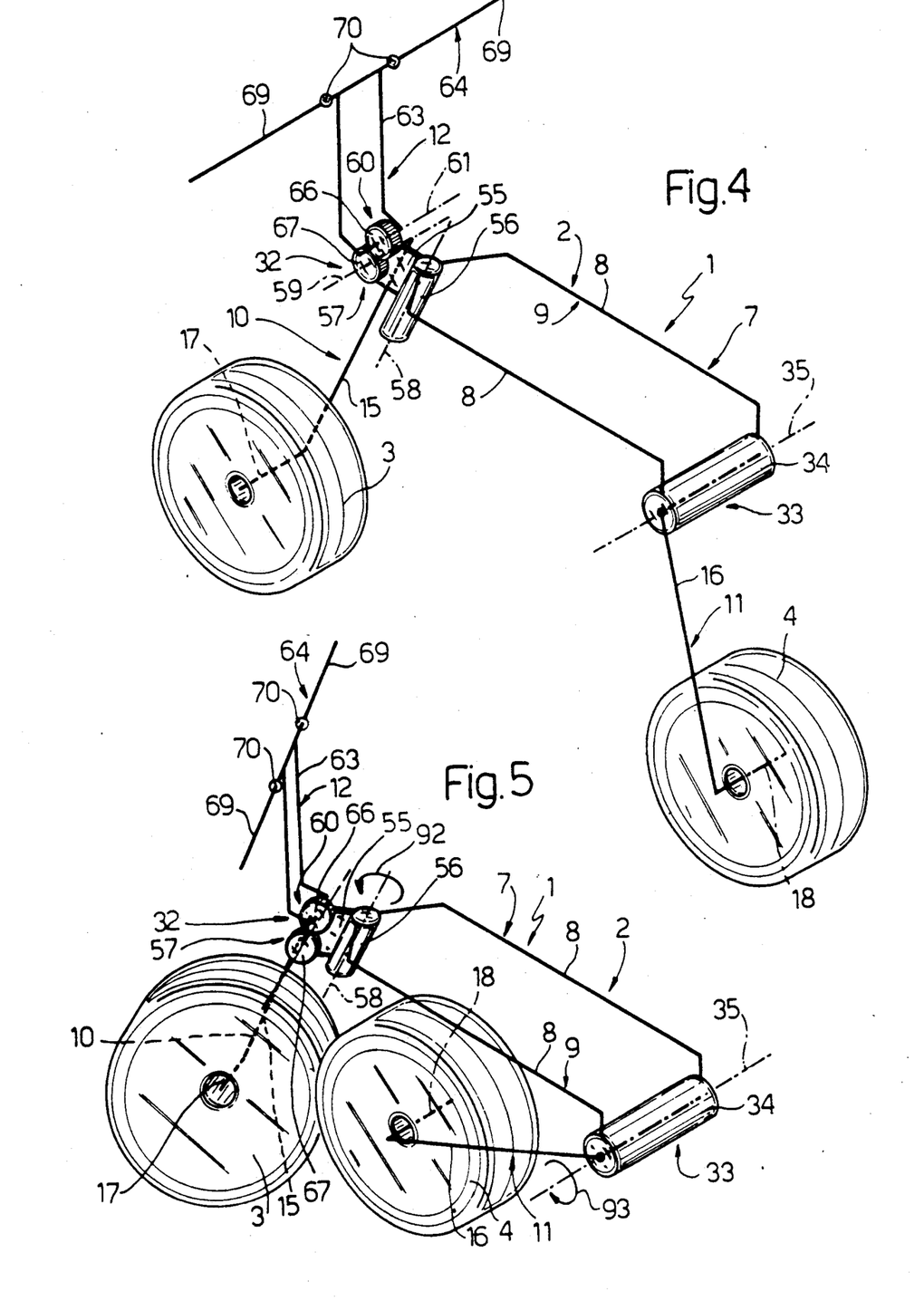
FIGS. 4 to 7 show schematic views of the operating sequence for collapsing the FIG. 1 motorcycle.
Figure 6:
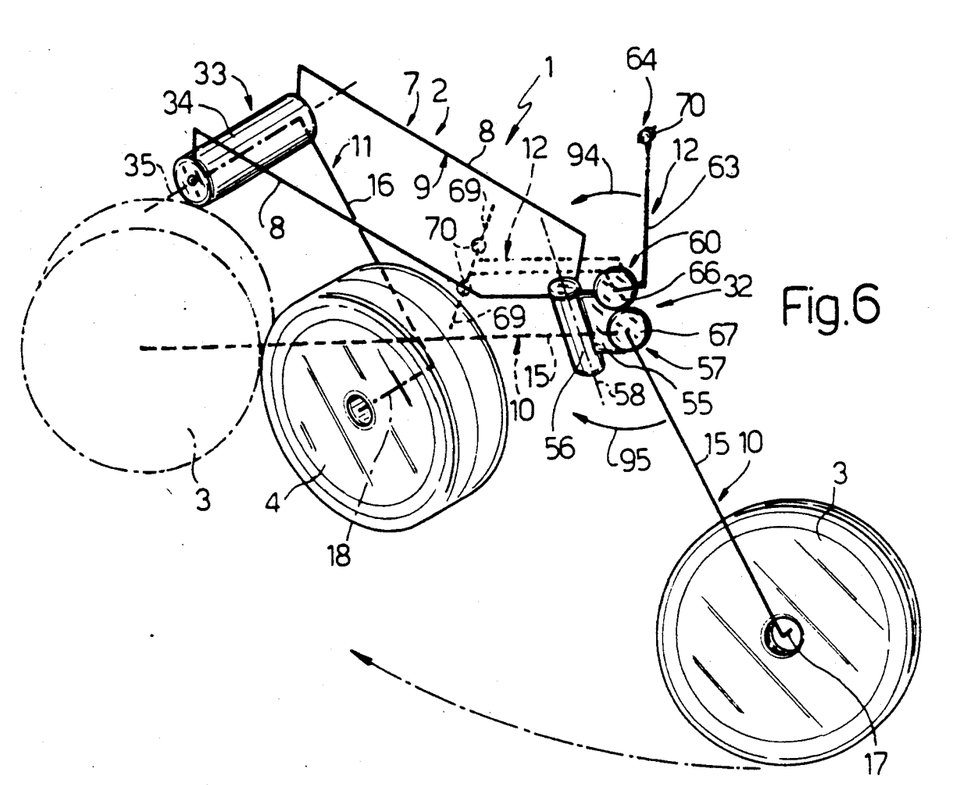

With reference to FIG. 4 showing a schematic view of motorcycle 1 in the distended position, it should be pointed out that, though not illustrated or described for reasons of simplicity, frame 2 features releasable stop and lock elements for defining the distended position of both column 63 and arm 16 in relation to intermediate body 7, as well as for locking steering hinge 56 when steering device 12 is collapsed over intermediate body 7.

Figure 7:
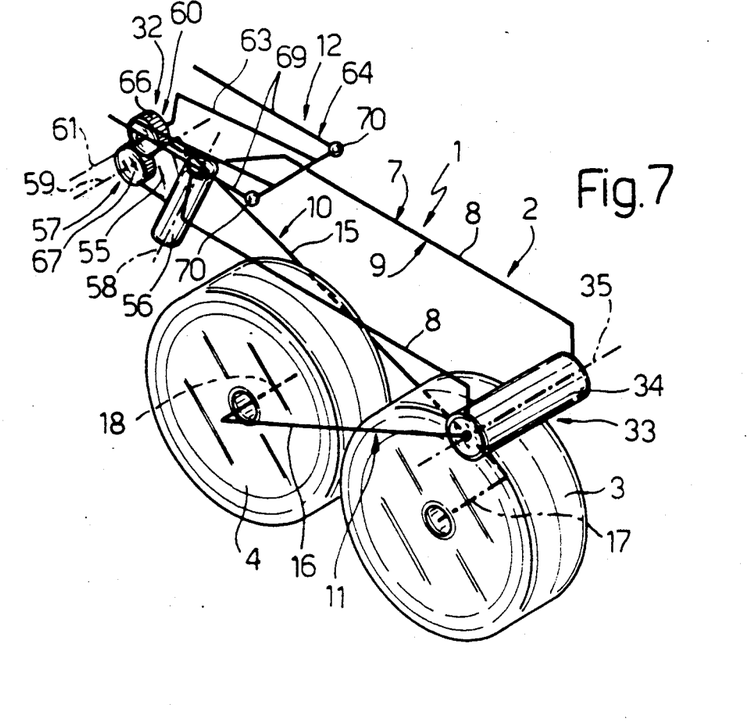

The first step for switching from the FIGS. 1 and 4 to the FIGS. 3 and 7 position is to release levers 54 of devices 36 locking hinges 34 and 57 from the locked position shown in FIG. 8 to the released position shown in FIG. 9, thus enabling rotation of element 11 about axis 35, element 10 about axis 59, and steering device 12 about axis 61. It should be pointed out here that device 36 locking hinge 57 also provides for locking hinge 60 via the transmission consisting of gears 66 and 67.

As shown in FIG. 5, wheel 3 is then set to the maximum steering position, so as to turn bridge element 55 about axis 58 of steering hinge 56 in the direction of arrow 92.

At this point, after turning rods 69 about respective axes 72 (FIG. 11) into the position shown by the dotted line in FIGS. 10 and 11, and rocker arms 88 about pins 87 into the position shown by the dotted line in FIG. 12, element 11 is turned forwards about axis 35 of hinge 34 in the direction of arrow 93 (FIG. 5). Such rotation causes engine 5 to move forwards and upwards into opening 9 of intermediate body 7, and rear wheel 4 to move forwards and upwards, along plane 6, into the space between arms 85 of fork member 83 (FIG. 3) and into a position wherein wheels 91 project outwards of a peripheral bottom portion of wheel 4.

At the same time element 11 is being turned in the direction of arrow 93, steering device 12 is turned backwards and downwards about axis 61 and in the direction of arrow 54 (FIG. 6) so as to position column 63 substantially horizontally. By virtue of gears 66 and 67, rotation of steering device 12 in the direction of arrow 94 causes element 10 to turn in the opposite direction (arrow 95) about axis 59. Such rotation causes front wheel 3 to move backwards and upwards to substantially the same height as collapsed rear wheel 4. As front wheel 3 is set to the maximum steering position when element 10 starts turning in the direction of arrow 95, rotation of element 10 causes wheel 3 to move along a curved trajectory, away from plane 6 and outwards of fork member 83, into a position behind wheel 4 and laterally offset (as shown by the dotted line in FIG. 6) in relation to both wheel 4 and intermediate body 7.

Though illustrated, for the sake of simplicity, in two separate diagrams, it should be pointed out that rotation as described above in the direction of arrows 93, 94 and 95 may, and often is, performed simultaneously. Once steering device 12 and wheel 3 are positioned as shown by the dotted lines in FIG. 6, motorcycle 1 is collapsed fully (FIGS. 3 and 7) by resetting steering device 12 to the non-steering position, by turning it, together with element 10 connected to it, about axis 58 of steering hinge 56 in the opposite direction to arrow 92.

Rotation of element 10 in the opposite direction to arrow 92 causes wheel 3 to move along a curved trajectory towards plane 6, and into a position substantially behind wheel in plane 6.

Motorcycle 1 is locked in the above collapsed position by locking levers 54 as shown in FIG. 8, and possibly also by locking steering hinge 56 by means of a lock device (not shown) located between steering device 12 and intermediate body 7.

Finally, seat 14 is moved forward from the dotted to the continuous line position in FIG. 3.

By fitting, for example, on the rear end of seat 14, a grip member (not shown) such as a pull-out handle, the rear end of collapsed motorcycle 1 may be raised for lifting not only wheel 3 but also wheel 4 off the ground, and so resting the full weight of motorcycle 1 on wheels 91, for enabling troublefree, stable transport of the same.

Hinge devices 32 and 33 therefore enable elements 10 and 11 to move, in relation to intermediate body 7 and together with respective wheels 3 and 4, along two independent trajectories, between a distended position, wherein respective arms 15 and 16 extend in diverging manner from intermediate body 7, and a collapsed position wherein rear wheel 4 is located to the front of front wheel 3, and arms 15 and 16 extend in converging manner from intermediate body 7 and intersect beneath the same for so aligning wheel 3 behind wheel 4 and preserving the original plane of symmetry 6.

The advantages of such a collapsed configuration as compared with the known state of the art will be clear from the foregoing description. The collapsed crossover position of arms 15 and 16 provides for maximising not only the compactness ratio of motorcycle 1 for a given wheel diameter, but also the wheel base for a given collapsed length of the same.

Moreover, the above advantages are achieved by means of a relatively staightforward structure wherein steering hinge 56, which necessarily features on any type of motorcycle, is decisive in enabling element 10 to move, together with wheel 3, along a trajectory comprising a portion wherein wheel 3 moves away from plane 6, and a portion wherein wheel 3 moves towards plane 6, and in no way interfering with the trajectory of wheel 4 which travels along plane 6.

I claim:

1.—A collapsible motorcycle (1) comprising a frame (2), a front steering wheel (3), a rear wheel (4), and an engine (5) supported on said frame (2) and connected to one of said wheels; said front wheel (3), in a non-steering position, and said rear wheel (4) presenting, in use, a common vertical plane of symmetry (6); and said frame (2) comprising a longitudinal intermediate body (7) substantially parallel to said plane (6); a first element (10) between said front wheel (3) and a front portion of said intermediate body (7); a second element (11) between said rear wheel (4) and a rear portion of said intermediate body (7); and a steering device (12); characterised by the fact that said first and said second elements (10, 11) each comprise a respective first and second arm (15, 16), and a respective first and second transverse hub (17, 18) integral with respective said arms (15, 16) and connected for rotation to respective said front and rear wheels (3, 4); first and second hinge means (32, 33) being provided between said intermediate body (7) and respective said first and second arms (15, 16) for enabling displacement, in relation to said intermediate body (7), of said first arm (15) with said front wheel (3) and said second arm (16) with said rear wheel (4) along a respective first and second non-interfering path, and between a distended position wherein said arms (15, 16) extend in substantially diverging manner from said intermediate body (7), and a collapsed position wherein said rear wheel (4) is located to the front of said front wheel (3), and said arms (15, 16) extend in converging manner from said intermediate body (7).

2.—A motorcycle as claimed in claim 1, characterised by the fact that, in said collapsed position, said wheels (3, 4) substantially preserve said common plane of symmetry (6).

3.—A motorcycle as claimed in claim 1, characterised by the fact that, when said front wheel (3) is set to the non-steering position, said arms (15, 16) extend on opposite sides of said plane (6), and said hubs (17, 18) extend from respective said arms (15, 16) towards said plane (6).

4.—A motorcycle as claimed in claim 1, characterised by the fact that one of said paths extends substantially parallel to said plane (6), whereas the other comprises a portion wherein the respective wheel (3) (4) travels away from said plane (6), and a further portion wherein the respective wheel (3) (4) travels towards said plane (6).

5.—A motorcycle as claimed in claim 1, characterised by the fact that said second path extends substantially parallel to said plane (6), whereas said first path comprises a portion wherein said front wheel (3) moves away from said plane (6), and a further portion wherein said front wheel (3) moves towards said plane (6).

6.—A motorcycle as claimed in claim 5, characterised by the fact that said first hinge means (32) comprise a bridge element (55) between said first arm (15) and said intermediate body (7), and a first and second cylindrical hinge (56, 57) respectively connecting said bridge element (55) to said intermediate body (7) and said first arm (15); said first and second cylindrical hinges (56, 57) respectively presenting a first and second axis (58, 59) at an angle to each other, and said first axis (58) lying in said plane (6).

7.—A motorcycle as claimed in claim 6, characterised by the fact that said first hinge (56) is a steering hinge for said front wheel (3).

8.—A motorcycle as claimed in claim 7, characterised by the fact that said first axis (58) is substantially parallel to said first arm (15) when said front wheel (3) is distended.

9.—A motorcycle as claimed in claim 7, characeised by the fact that said first and second axes (58, 59) are perpendicular.

10.—A motorcycle as claimed in claim 6, characterised by the fact that said second hinge means (33) comprise a cylindrical hinge (34) having its axis (35) perpendicular to said plane (6).

11.—A motorcycle as claimed in claim 10, characterised by first and second releasable lock means (36) respectively connected to the second cylindrical hinge (57) of said first hinge means (32) and the cylindrical hinge (34) of said second hinge means (33); said lock means (36) being operated selectively for locking the respective hinges (57, 34) in two positions corresponding respectively to the extended and collapsed position of the respective wheels (3, 4).

12.—A motorcycle as claimed in claim 7, characterised by the fact that said steering device (12) comprises a column (63) and a handlebar (64) connected to a first end of said column (63); a second end (65) of said column (63) being connected in rotary manner to said intermediate body (7) so as to rotate between a raised and lowered position in relation to the same.

13.—A motorcycle as claimed in claim 12, characterised by the fact that said column (63) is connected to said intermediate body (7) via said first hinge means (32).

14.—A motorcycle as claimed in claim 13, characterised by the fact that said first hinge means (32) comprise a third cylindrical hinge (60) parallel to said second cylindrical hinge (57) and located between said bridge element (55) and said second end (65) of said column (63).

15.—A motorcycle as claimed in claim 14, characterised by the fact that transmission means (66, 67) are provided between said second and third hinges (57, 60); said transmission means being such that rotation of said column (63) about the axis (61) of said third hinge (60) causes said first arm (15) to turn in the opposite direction about the axis (59) of said second hinge (57).

16.—A motorcycle as claimed in claim 12, characterised by the fact that said handlebar (64) comprises two rods (69) on opposite sides of said column (63); and connecting means (70) between said rods (69) and said column (63) for enabling said rods (69) to move, in relation to said column (63), between a first position wherein said rods (69) are arranged substantially coaxial with each other and across said column (63), and a second position wherein said rods (69) are substantially parallel and adjacent to said column (63).

17.—A motorcycle as claimed in claim 16, characterised by the fact that said connecting means (70) comprise, for each said rod (69), a cylindrical hinge (73) having its axis (74) inclined substantially 45° in relation to the longitudinal axis of said column (63).

18.—A motorcycle as claimed in claim 1, characterised by the fact that said first and second arms (15, 16) each comprise a telescopic damper.

19.—A motorcycle as claimed in claim 18, characterised by the fact that each said telescopic damper comprises two cylindrical telescopically-connected tubes (21, 22), and a key device (23) located between said tubes (21, 22) for preventing rotation of one in relation to the other.

20.—A motorcycle as claimed in claim 1, characterised by the fact that said rear wheel (4) is the drive wheel; said engine (5) being supported on said second arm (16) and moving with the same between said distended and collapsed positions.

21.—A motorcycle as claimed in claim 20, characterised by the fact that said intermediate body (7) comprises two side members (8) connected together at opposite ends and defining an opening (9) housing said engine (5) when said second arm (16) is collapsed.

22.—A motorcycle as claimed in claim 1, characterised a seat (14) supported on said rear portion of said intermediate body (7).

23.—A motorcycle as claimed in claim 22, characterised by the fact that said seat (14) is connected to said intermediate body (7) via slide type connecting means (13) enabling said seat (14) to move between a forward and rear position in relation to said intermediate body (7).

24.—A motorcycle as claimed in claim 1, characterised by the fact that said intermediate body (7) comprises, on its front portion, a fork member (83) extending downwards and comprising two bars (85) on opposite sides of said plane (6); a footrest (89) being connected in rotary manner to the free bottom end of each said bar (85) so as to turn, in relation to the same and about an axis substantially parallel to said plane (6), between a raised position substantially parallel to the respective bar (85), and a lowered position substantially perpendicular to said bar (85).

25.—A motorcycle as claimed in claim 24, characterised by the fact that each said footrest (89) constitutes a first arm of a respective square rocker arm (88) comprising a second arm (90) integral with the first (89), and a wheel (91) mounted for rotation on the respective said second arm (90).

26.—A motorcycle as claimed in claim 25, characterised by the fact that said two bars (85) of said fork (83) define an opening housing said rear wheel (4) in the collapsed position; said two wheels (91) being substantially coaxial with each other and parallel to said plane (6) when both respective said rocker arms (88) are raised, and projecting outwards of the bottom portion of said rear wheel (4) in the collapsed position.

* * * * *